United States Patent
Lestringant et al.

(10) Patent No.: US 10,343,378 B2
(45) Date of Patent: Jul. 9, 2019

(54) THIN LAMINATED GLASS FOR WINDSCREEN

(71) Applicant: SAINT-GOBAIN GLASS FRANCE, Courbevoie (FR)

(72) Inventors: Claire Lestringant, Paris (FR); René Gy, Bondy (FR); Stephan Kremers, Heinsberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 25 days.

(21) Appl. No.: 15/031,356

(22) PCT Filed: Oct. 22, 2014

(86) PCT No.: PCT/FR2014/052685
§ 371 (c)(1),
(2) Date: Apr. 22, 2016

(87) PCT Pub. No.: WO2015/059407
PCT Pub. Date: Apr. 30, 2015

(65) Prior Publication Data
US 2016/0257094 A1  Sep. 8, 2016

(30) Foreign Application Priority Data
Oct. 23, 2013  (FR) ..................... 13 60326

(51) Int. Cl.
*B32B 17/10* (2006.01)
*B60J 1/02* (2006.01)

(52) U.S. Cl.
CPC .. *B32B 17/10119* (2013.01); *B32B 17/10036* (2013.01); *B32B 17/10761* (2013.01); *B32B 17/10889* (2013.01); *B60J 1/02* (2013.01); *B32B 2309/02* (2013.01)

(58) Field of Classification Search
CPC .......... B32B 17/10119; B32B 17/10036; B60J 1/001; B60J 1/003; B60J 1/02
See application file for complete search history.

(56) References Cited

U.S. PATENT DOCUMENTS

| | | | |
|---|---|---|---|
| 3,558,415 A | 1/1971 | Rieser et al. | |
| 4,113,904 A * | 9/1978 | Kiefer | B32B 17/10045 428/34 |
| 5,462,805 A * | 10/1995 | Sakamoto | B32B 17/10 428/215 |
| 7,666,511 B2 * | 2/2010 | Ellison | C03B 17/06 428/426 |
| 2009/0297806 A1 | 12/2009 | Dawson-Elli | B32B 17/10036 428/213 |
| 2009/0321005 A1 * | 12/2009 | Higuchi | B32B 7/06 156/249 |
| 2010/0015439 A1 * | 1/2010 | Buether | B32B 17/10036 428/337 |
| 2011/0261429 A1 * | 10/2011 | Sbar | B32B 17/10045 359/265 |
| 2012/0017975 A1 * | 1/2012 | Giron | B32B 17/10036 136/252 |
| 2012/0128952 A1 * | 5/2012 | Miwa | B32B 17/10036 428/215 |
| 2012/0269995 A1 * | 10/2012 | Leighton | B32B 7/04 428/34 |
| 2012/0318356 A1 * | 12/2012 | Fechner | C03C 3/112 136/259 |
| 2012/0328843 A1 * | 12/2012 | Cleary | B32B 17/10036 428/174 |
| 2014/0065374 A1 * | 3/2014 | Tsuchiya | B32B 17/10018 428/174 |
| 2014/0158201 A1 * | 6/2014 | Aitken | H01L 31/0488 136/259 |
| 2015/0064411 A1 * | 3/2015 | Sasai | B32B 7/02 428/174 |
| 2015/0132584 A1 * | 5/2015 | Van Den Bergen | C08F 220/22 428/441 |
| 2015/0140301 A1 * | 5/2015 | Fisher | B32B 17/10036 428/215 |
| 2015/0165730 A1 * | 6/2015 | Panzner | B32B 17/10045 428/213 |
| 2015/0174861 A1 * | 6/2015 | Hasegawa | B32B 17/10018 428/337 |
| 2015/0202854 A1 * | 7/2015 | Tsuchiya | C03C 3/087 428/179 |
| 2015/0258750 A1 * | 9/2015 | Kang | B32B 17/10018 428/174 |

(Continued)

FOREIGN PATENT DOCUMENTS

EP  0 448 447 A1  9/1991
EP  0 884 289 A1  12/1998

(Continued)

OTHER PUBLICATIONS

Chart of log of viscosity vs. temperature for various glass compositions, from Shand, Engineering Glass, Modern Material, vol. 6, Academic Press, New York, 1968, p. 262.*

(Continued)

*Primary Examiner* — Z. Jim Yang
(74) *Attorney, Agent, or Firm* — Pillsbury Winthrop Shaw Pittman LLP

(57) ABSTRACT

A laminated glazing includes at least one outer glass sheet, an inner glass sheet and a polymeric insert located between the two glass sheets, in which the inner sheet has a thickness of not more than 1.5 mm, the outer glass sheet is a glass sheet of different chemical composition from that of the inner sheet, the difference between the temperatures Tp1 and Tp2 being less than 80° C., the temperature Tp1 being defined as the mean between the upper annealing temperature and the softening point of the outer glass sheet and the temperature Tp2 being defined as the mean between the upper annealing temperature and the softening point of the inner glass sheet.

16 Claims, No Drawings

(56) References Cited

U.S. PATENT DOCUMENTS

| | | | | |
|---|---|---|---|---|
| 2015/0329415 A1* | 11/2015 | Bellman | ............... | B32B 7/06 428/141 |
| 2016/0136929 A1* | 5/2016 | Meiss | ............... | C03C 21/002 428/213 |
| 2016/0250982 A1* | 9/2016 | Fisher | ............... | B32B 17/06 428/215 |
| 2016/0280591 A1* | 9/2016 | Cleary | ............. | B32B 17/10137 |

FOREIGN PATENT DOCUMENTS

| | | | | |
|---|---|---|---|---|
| EP | 0 914 298 B1 | | 8/2008 | |
| EP | 2 409 834 A1 | | 1/2012 | |
| EP | 2 695 864 A1 | | 2/2014 | |
| GB | 1 339 980 A | | 12/1973 | |
| GB | 2 078 169 A | | 1/1982 | |
| GB | 2078169 A | * | 1/1982 | ....... B32B 17/10036 |
| WO | WO 02/064519 A1 | | 8/2002 | |
| WO | WO 2004/087590 A2 | | 10/2004 | |
| WO | WO 2006/072721 A1 | | 7/2006 | |
| WO | WO 2012/051038 A1 | | 4/2012 | |
| WO | WO 2012/137742 A1 | | 10/2012 | |
| WO | WO 2012/177426 A1 | | 12/2012 | |
| WO | WO 2013188489 A1 | * | 12/2013 | ....... B32B 17/10036 |
| WO | WO 2014176059 A1 | * | 10/2014 | ....... B32B 17/10036 |

OTHER PUBLICATIONS

Springer Handbook of COndensed Matter and Materials Data, 2005, p. 528-529, obtained from http://extras.springer.com/2005/978-3-540-44376-6/10678245/10678245-B-1.*

NPL on Schott Xensation. Obtained from www.schott.com/xensation.*

NPL on Schott Borofloat. Obtained from www.us.schott.com, 2012.*

International Search Report as issued in International Patent Application No. PCT/FR2014/052685, dated Feb. 12, 2015.

* cited by examiner

THIN LAMINATED GLASS FOR WINDSCREEN

CROSS-REFERENCE TO RELATED APPLICATIONS

This application is the U.S. National Stage of PCT/FR2014/052685, filed Oct. 22, 2014, which in turn claims priority to French Application No. 1360326, filed Oct. 23, 2013. The contents of all of these applications are incorporated herein by reference in their entirety.

The present invention relates to laminated glazing consisting of at least two thin sheets of glass. The invention relates more particularly to a laminated glazing for use in the motor vehicle sector, especially as a windshield.

Laminated glazings are commonly used in the motor vehicle, aeronautical or building sector, since they have the advantage of being "safety" glazings. They consist of at least two sheets of glass linked together by an insert layer made of plastic, generally of polyvinyl butyral (PVB). Conventionally, the glazings used for windshields are asymmetrical and consist of two sheets of silicon-sodium-calcium glass, of different thicknesses, the outer sheet generally being thicker than the inner sheet. To improve the mechanical strength of this type of glazing, it is known practice to reinforce the constituent glass sheets by tempering them and thus creating a surface zone in compression and a central zone in tension. U.S. Pat. No. 3,558,415 describes a bent laminated glazing in which the outer and inner glass sheets have been chemically tempered so as to have a surface zone in compression. Patent GB 1 339 980 describes a windshield glazing in which only the outer glass sheet is chemically tempered.

A problem regularly encountered in the motor vehicle sector relates to the weight of the glazings. The windshields currently manufactured typically have an outer sheet with a thickness of between 2.1 and 2.6 mm and an inner sheet with a thickness of between 1.6 and 2.1 mm. It is currently sought to reduce the weight of glazings without, however, compromising the mechanical strength properties. Patent applications WO 2012/051 038 and WO 2012/177 426 describe laminated glasses in which the glass sheets have a thickness of less than 2 mm and at least one of the glass sheets is chemically tempered. The reduction in thickness of the constituent glass sheets of a windshield allows its weight to be reduced but may give rise to mechanical problems, especially an increase in its fragility when it is exposed to projections of gravel. The solution proposed by the documents cited above for improving the mechanical strength consists in chemically tempering the outer glass sheet. The process of chemical tempering, or ionic exchange, consists of the surface replacement of an ion of the glass sheet (generally an ion of an alkali metal such as sodium) with an ion of larger ionic radius (generally an ion of another alkali metal such as potassium) and in creating residual compression stresses at the surface of the sheet, down to a certain depth. This is a relatively expensive and long process and is consequently poorly compatible with a continuous industrial process.

A step of bending glass sheets is essential for the desired applications. Bending makes it possible to give the glass sheets a curvature and thus to facilitate the assembling of the various sheets constituting the laminated glazing. Many bending processes may be used. Mention will be made, for example, of bending by gravity, bending by passing between conveying rollers, bending by pressing against a solid form, performed either using a frame or by suction. The simultaneous bending of glass sheets on a framework by gravity and/or partially by pressing (as described in patent applications EP 0 448 447, WO 2004/087 590, WO 02/064 519 or WO 2006/072 721) are techniques used for simultaneously bending the two glass sheets intended to form a bent laminated glazing such as a haulage vehicle windshield. The two glass sheets laid one on the other are supported along their marginal extremities substantially horizontally by a frame having the desired profile, i.e. the profile corresponding to the final profile of the two bent glass sheets. Thus supported, the two glass sheets pass through a bending oven, generally an oven having different temperature zones. When the two glass sheets are of different chemical composition, their behavior during this bending step may be different, and the risk of appearance of defects or of residual stresses is consequently increased. One solution proposed when the physicochemical properties and the thicknesses of the glass sheets are different is described in patent application GB 2 078 169 and consists in reversing the order of the glass sheets during the bending process relative to the order that these same sheets have during the assembly phase.

It would be useful, for the sake of the optical quality of the products, the cost, the weight and simplification of the technology, to have available a thin laminated glass whose mechanical strength is compatible with the desired applications, and which consists of glass sheets that can be simultaneously bent, without the need to modify the order of the glass sheets between the bending step and the assembly step. Simultaneous bending and direct assembly, without reversal of the sheets, is all the more interesting since the constituent sheets of the glazing are of low thickness.

The present invention falls within this context, the subject of which is a laminated glazing which comprises at least one outer glass sheet, an inner glass sheet and a polymeric insert located between the two glass sheets, in which the inner sheet has a thickness of not more than 1.5 mm and the outer glass sheet is a glass sheet of different chemical composition from that of the inner sheet, the difference $\Delta Tp$ between the temperatures $Tp1$ and $Tp2$ being less than 80° C., preferably less than 70° C. and even more preferentially less than 60° C.;

the temperature $Tp1$ being defined as the average between the upper annealing temperature and the softening point of the outer glass sheet and the temperature $Tp2$ being defined as the average between the upper annealing temperature and the softening point of the inner glass sheet, the general formula defining the temperature $Tp$ being $$Tp = (T_{softening} + T_{annealing})/2$$

the upper annealing temperature corresponding to the temperature at which the viscosity of the glass is $10^{13}$ poises and the softening point corresponding to the temperature at which the viscosity of the glass is $10^{7.6}$ poises.

The temperature $Tp1$ which corresponds to the average of the temperatures defined above for the outer sheet is, according to the invention, higher than the temperature $Tp2$, corresponding to the average of the temperatures defined above for the inner sheet.

The temperature $Tp1$ is higher than the temperature $Tp2$, and as such the difference $\Delta Tp$ between the temperatures $Tp1$ and $Tp2$ is positive.

The difference $\Delta Tp$ is thus between 0 and 80° C.

In the present invention, the term "outer" is used for everything relating to the exterior of the device receiving the glazing. The outer glass sheet is consequently that which is positioned facing the exterior of the cockpit. Conversely, the term "inner" is used for that relating to the interior of the device receiving the glazing. An inner sheet of a laminated glazing corresponds to the sheet that is placed facing the interior of the cockpit.

The inventors have demonstrated that it is possible to produce a laminated glazing with a total thickness of less than 4.5 mm, or even 4 mm, with two glass sheets of different chemical composition and which can be bent simultaneously, and then assembled directly, without reversal of the order of the glass sheets. Thus, the product is obtained without the need to bend each of the two sheets separately, despite their different chemical composition. It conserves satisfactory mechanical strength for use as a motor vehicle windshield. An important consequence for the final product is especially its lightened weight, leading to lightening of the weight of the vehicle and reduced consumption. An asymmetric assembly, in thickness and in chemical composition, combining an outer glass sheet and a very thin inner glass sheet, advantageously makes it possible to obtain strong, lightened windshields.

Each glass sheet, depending on its composition, is characterized by its upper annealing temperature (or simply "annealing temperature") and its softening point (also known as the "Littleton temperature").

The annealing temperature corresponds to the temperature for which the viscosity of the glass is high enough for disappearance of the stresses to be able to take place entirely within a given time (stress relaxation time of about 15 minutes). It is occasionally referred to as the "stress relaxation temperature". This temperature corresponds to the moment at which the viscosity of the liquid η is $10^{13}$ poises. Measurements of this temperature are conventionally performed according to standard NF B30-105.

The softening point is defined as being the temperature at which a glass yarn with a diameter of about 0.7 mm and a length of 23.5 cm lengthens by 1 mm/minute under its own weight (standard ISO 7884-6). The corresponding viscosity is $10^{7.6}$ poises.

The temperature Tp is defined in the following manner:

$$Tp=(T_{softening}+T_{annealing})/2$$

Each glass sheet is characterized, as a function of its composition, by a temperature Tp. The laminated glazing according to the present invention must be composed of two glass sheets whose temperatures Tp are as close as possible, to satisfy the desired requirement for simultaneous bending. For applications in the motor vehicle sector and especially as windshields, it is important to ensure that the process for manufacturing the laminated glazing, especially the bending or forming steps, do not produce defects in the glazing.

The laminated glazing according to the present invention has the advantage of being able to be bent without increasing the risk of creating residual stresses or optical defects. The two constituent glass sheets of the glazing have a different chemical composition but are such that it is possible to bend them together without complicating the process on account of the difference in chemical composition of the two glass sheets, and especially without the need to reverse the order of the glass sheets between the bending step and the assembly step.

The outer glass sheet has a thickness of not more than 2.1 mm and preferably not more than 1.6 mm. Thus, this relatively low thickness of the outer sheet also contributes toward lightening the weight of the laminated glazing. The laminated glazing according to the present invention has good mechanical strength and good durability of the glazing after damage by projection of gravel. The risks of breakage during the subsequent application of heat gradients on embrittled glazings, especially, for example, during the deicing of a windshield, are thus reduced.

The chemical composition of the outer sheet is different from that of the inner glass sheet. Advantageously, the laminated glass according to the present invention has an outer glass sheet made of "special glass" whose composition is chosen from the compositions given below.

The glass compositions below mention only the essential constituents. They do not give the minor elements of the composition, for instance the conventionally used refining agents such as arsenic, antimony, tin and cerium oxides, metal halides or sulfides or coloring agents, especially such as iron oxides, cobalt, chromium, copper, vanadium, nickel and selenium oxides, which are most often necessary for glass applications in motor vehicle glazing.

According to one embodiment, the outer glass sheet has a chemical composition of borosilicate type. The outer glass sheet may be such that its chemical composition comprises the following oxides in the weight content ranges defined below:

| | |
|---|---|
| $SiO_2$ | 75-85%, |
| $Al_2O_3$ | 2-3%, |
| $B_2O_3$ | 10-15%, |
| $Na_2O + K_2O$ | 3-7%. |

According to another embodiment, the outer glass sheet may also be of the sodium aluminosilicate type and such that its chemical composition comprises the following oxides in the weight content ranges defined below:

| | |
|---|---|
| $SiO_2$ | 55-71%, |
| $Al_2O_3$ | 2-15%, preferably 4-15% |
| $Na_2O$ | 9-18% |
| $MgO$ | 2-11% |
| $K_2O$ | 1-15% |
| $B_2O_3$ | 0-5%, |
| $CaO$ | 0-5% |
| $SnO_2$ | 0-5% |

This type of glass is described, for example, in patent EP-B-0 914 298.

The laminated glazing is preferably asymmetrical in thickness: the thickness of the outer glass sheet is greater than the thickness of the inner glass sheet.

According to one embodiment, the outer glass sheet is a non-reinforced glass sheet.

For the purposes of the present invention, the term "non-reinforced" means that the sheet is neither chemically reinforced nor thermally reinforced, before bending. As they are not chemically reinforced, the sheets normally do not contain an overconcentration of an oxide of an alkali metal such as Na or K at the surface relative to the core. Nevertheless, certain stresses, advantageously in compression, may appear in the glass and result from the assembly with the polymeric insert.

It is, however, possible, if the user so desires and if the glass so permits, to chemically reinforce the glass sheets by tempering.

The inner sheet of the laminated glazing has a thickness of not more than 1.5 mm. Preferentially, this sheet has a thickness of not more than 1.1 mm, or even is less than 1 mm. Advantageously, the inner glass sheet has a thickness of less than or equal to 0.7 mm. The thickness of the glass sheet is at least 50 μm.

Preferably, the inner glass sheet has a chemical composition of silicon-sodium-calcium type.

Conventionally, the inner glass sheet is a glass of silicon-sodium-calcium composition such that it comprises the following oxides in the weight ranges defined below:

| | |
|---|---|
| $SiO_2$ | 65-75%, |
| $Na_2O$ | 10-20% |
| CaO | 5-15%, |
| $Al_2O_3$ | 0-5%, |
| $K_2O$ | 0-5% |
| MgO | 0-5%. |

For reasons of cost, it is effectively more advantageous to manufacture a laminated glazing with only one sheet of special glass. Advantageously, the coloring and/or functionality of the laminated glazing are provided by means of the inner glass sheet. To do this, an inner glass sheet that has optical and/or energy functions may be chosen, for example by using a tinted inner glass sheet. According to a preferred embodiment, the laminated glazing according to the present invention comprises an inner sheet of silicon-sodium-calcium type (ordinary glass) and an outer sheet made of special glass, which is not of silicon-sodium-calcium type.

The polymeric insert may consist of one or more layers of thermoplastic. It may especially be made of polyurethane, polycarbonate, polyvinyl butyral (PVB), polymethyl methacrylate (PMMA), ethylene-vinyl acetate (EVA) or ionomeric resin. The polymeric insert may be in the form of a multilayer film with particular functionalities, for instance better acoustic properties, anti-UV properties, etc.

The thickness of the polymeric insert is between 50 μm and 4 mm. Generally, the thickness of the insert is less than 1 mm. In motor vehicle glazings, the thickness of the polymeric insert is conventionally 0.76 mm.

When the glass sheets are very thin and have a thickness of less than 1 mm, it may be advantageous to use a polymeric sheet with a thickness of greater than 1 mm, or even greater than 2 or 3 mm, to give the glazing rigidity, without resulting in an excessive weight increase of the structure.

Conventionally, the insert comprises at least one layer of polyvinyl butyral (or PVB).

The laminated glazing according to the present invention advantageously constitutes a motor vehicle glazing and especially a windshield. The constituent sheets of the laminated glazing are bent together before being assembled with the polymeric insert to form the finished product.

The examples below illustrate the invention without limiting its scope.

The table below describes chemical compositions of five different glasses.

composition C1: standard clear glass of silicon-sodium-calcium type composition C2: glass of borosilicate type composition C3: glass of sodium aluminosilicate type composition C4: glass of chemically reinforced aluminosilicate type, according to the prior art (as described in patent application WO 2012/177 426)

composition C5: glass of alkali-metal-free borosilicate type

TABLE 1

Composition of the glasses used

| weight % | C1 | C2 | C3 | C4 | C5 |
|---|---|---|---|---|---|
| $SiO_2$ | 71.1 | 80.6 | 60.7 | 61.9 | 63.6 |
| $Al_2O_3$ | 0.65 | 2.3 | 7.7 | 16.6 | 16 |
| $B_2O_3$ | | 13 | | 13.5 | 10.7 |
| $Na_2O$ | 13.8 | 3.4 | 13.1 | 2.9 | |
| $K_2O$ | 0.25 | 0.6 | 9.55 | | |
| $Li_2O$ | | | | | |
| CaO | 8.75 | | | | 7.8 |
| MgO | 4 | | 8.4 | 3.4 | 0.1 |
| ZnO | | | | | 0.7 |

The temperatures Tp of the glasses of compositions C1 to C5 are given in Table 2.

TABLE 2 temperature Tp for each composition described in Table 1

| | $T_p = (T_{annealing} + T_{softening})/2$ (° C.) |
|---|---|
| C1 | (545 + 725)/2 = 635 |
| C2 | (560 + 821)/2 = 690 |
| C3 | (540 + 740)/2 = 640 |
| C4 | (609 + 843)/2 = 726 |
| C5 | (722 + 971)/2 = 846 |

A laminated glazing in accordance with the present invention is manufactured using an outer glass sheet of composition C3 1.6 mm thick, a PVB insert 0.76 mm thick and an inner glass sheet of composition C1 0.55 mm thick. The difference in temperature Tp of these two glass sheets is 5° C.: these two sheets are simultaneously bent.

The glass sheet of composition C3 is particularly capable of being chemically reinforced by tempering. The assembly of a chemically reinforced glass sheet of chemical composition C3 with a thin inner glass sheet of silicon-sodium-calcium glass makes it possible to obtain a laminated glazing of low thickness, with good mechanical strength and for which the two glass sheets may be simultaneously bent.

For comparative purposes, a laminated glazing is prepared by assembling an outer glass sheet of composition C4 1 mm thick with a 0.76 mm PVB insert and an inner glass sheet of composition C1. From a mechanical viewpoint, the strength tests are acceptable, the outer glass being chemically reinforced. On the other hand, the difference in temperature Tp between these two glass sheets is 91° C.: the two glass sheets cannot be bent simultaneously.

In order to compare the resistance of different laminated glazings to projections of gravel, an indentation test (called «Sarbacane» test) is performed. This test consists in releasing a weighted (3.2 g weight) Vickers diamond indenter on the outer face of a plate of laminated glazing 200×200 mm in size, held in a flexible rubber frame, from different heights (from 100 to 2000 mm). The flexible frame allows the laminated glazing to be deformed during the impact of the indenter. The drop height until a star-shaped crack is visible on inspection with a microscope, or whose maximum size exceeds 10 mm, after impact on the outer glass sheet (impact depth of between 100 and 150 μm) is thus measured. The height is increased by 100 mm between each drop of the indenter and the first height at which the crack is observed is noted. Each laminated glazing is tested at nine different points of impact. The drop height value given in the examples below corresponds to the mean of the nine fracture height values. The detection of the crack takes place immediately after dropping the Vickers indenter.

A laminated glazing is assembled comprising an outer glass sheet of composition C2 1.1 mm thick, a 0.76 mm PVB insert and an inner glass sheet of composition C1 0.55 mm thick. The indentation test ("Sarbacane" test) is performed on this laminated glazing: the mean drop height measured is 1918 mm. For comparative purposes, the same test performed on a laminated glazing consisting of two glass sheets of composition C1 with respective thicknesses of 1.1 mm for the outer sheet and 0.55 mm for the inner sheet leads to a measured mean drop height of 989 mm. The mechanical strength of the laminated glazing according to the present invention is satisfactory for the intended applications. Moreover, the difference in temperature Tp of the two glass sheets is 55° C.: the two glass sheets are bent simultaneously.

A laminated glazing is assembled comprising an outer glass sheet of composition C5 0.7 mm thick, a 0.76 mm PVB insert and an inner glass sheet of composition C1 0.7 mm thick. The indentation test ("Sarbacane" test) is performed on this laminated glazing: the mean drop height measured is 1960 mm. For comparative purposes, the same test performed on a laminated glazing consisting of two glass sheets of composition C1 with respective thicknesses of 0.7 mm for the outer sheet and 0.7 mm for the inner sheet leads to a measured mean drop height of 633 mm. The mechanical strength of the laminated glazing is satisfactory for the intended applications. However, the difference in temperature Tp of the two glass sheets is 211° C.: the two glass sheets cannot be bent simultaneously. The mechanical strength of this assembly satisfies the desired criteria, but, on account of the different chemical compositions of the two glass sheets and of a viscous behavior that is also very different, it is not possible to bend these two sheets together.

The invention claimed is:

1. A laminated glazing comprising at least one outer glass sheet, an inner glass sheet and a polymeric insert located between the outer and inner glass sheets, in which
the inner glass sheet has a thickness of not more than 1.5 mm,
the outer glass sheet is a non-chemically reinforced glass sheet of different chemical composition from that of the inner glass sheet,
a difference between the temperatures Tp1 and Tp2 being less than 80° C., with temperature Tp1 being greater than temperature Tp2,
wherein the temperature Tp1 is the average of the upper annealing temperature and the softening point of the outer glass sheet, and wherein the temperature Tp2 is the average of the upper annealing temperature and the softening point of the inner glass sheet, a general formula defining the temperature Tp being $Tp=(T_{softening}+T_{annealing})/2$ wherein the upper annealing temperature corresponding to the temperature at which a viscosity of a glass material is $10^{13}$ poises and the softening point corresponding to the temperature at which a viscosity of a glass material is $10^{7.6}$ poises,
wherein the laminated glazing is a bent glazing and constitutes a motor vehicle windshield,
wherein a thickness of the outer glass sheet is greater than the thickness of the inner glass sheet, and
wherein the polymeric insert has a thickness from 500 μm to 4 mm.

2. The glazing as claimed in claim 1, wherein the difference between the temperatures Tp1 and Tp2 is less than 70° C.

3. The glazing as claimed in claim 1, wherein the outer glass sheet has a thickness of not more than 2.1 mm.

4. The glazing as claimed in claim 1, wherein the polymeric insert comprises one or more layers of thermoplastic chosen from polyurethane, polycarbonate, polyvinyl butyral (PVB), polymethyl methacrylate (PMMA) and ethylene-vinyl acetate (EVA) or an ionomeric resin.

5. The glazing as claimed in claim 4, wherein the polymeric insert comprises at least one layer made of polyvinyl butyral.

6. The glazing as claimed in claim 1, wherein the outer glass sheet has a chemical composition of a borosilicate glass.

7. The glazing as claimed in claim 6, wherein the outer glass sheet comprises

| | |
|---|---|
| $SiO_2$ | 75-85%, |
| $Al_2O_3$ | 2-3%, |
| $B_2O_3$ | 10-15%, |
| $Na_2O + K_2O$ | 3-7%. |

8. The glazing as claimed in claim 1, wherein the outer glass sheet has a chemical composition of a sodium aluminosilicate glass.

9. The glazing as claimed in claim 8, wherein the outer glass sheet comprises

| | |
|---|---|
| $SiO_2$ | 55-71%, |
| $Al_2O_3$ | 2-15% |
| $Na_2O$ | 9-18% |
| $MgO$ | 2-11% |
| $K_2O$ | 1-15% |
| $B_2O_3$ | 0-5%, |
| $CaO$ | 0-5% |
| $SnO_2$ | 0-5%. |

10. The glazing as claimed in claim 9, wherein the outer glass sheet comprises 4-15% of $Al_2O_3$.

11. The glazing as claimed in claim 1, wherein the inner glass sheet has a thickness of not more than 1.1 mm.

12. The glazing as claimed in claim 1, wherein the inner glass sheet has a composition of a silicon-sodium-calcium glass.

13. The glazing as claimed in claim 2, wherein the difference between the temperatures Tp1 and Tp2 is less than 60° C.

14. The glazing as claimed in claim 3, wherein the outer glass sheet has a thickness of not more than 1.6 mm.

15. The glazing as claimed in claim 11, wherein the inner glass sheet has a thickness of less than 1 mm.

16. The glazing as claimed in claim 1, wherein the polymeric insert has a thickness from 760 μm to 4 mm.

* * * * *